US005762699A

United States Patent [19]

McGovern

[11] Patent Number: 5,762,699
[45] Date of Patent: Jun. 9, 1998

[54] PAVEMENT AGGREGATE TREATING COMPOSITION

[75] Inventor: Edward W. McGovern, Pittsburgh, Pa.

[73] Assignee: K.A.E. Paving Consultants, Inc., Wexford, Pa.

[21] Appl. No.: 851,127

[22] Filed: May 5, 1997

[51] Int. Cl.$^6$ ............................ C08L 95/00; C09D 195/00
[52] U.S. Cl. ............................ 106/279; 106/278; 106/280
[58] Field of Search .................................... 106/278, 279, 106/280

[56] References Cited

U.S. PATENT DOCUMENTS

| | | | |
|---|---|---|---|
| 3,221,615 | 12/1965 | McGovern | 106/285 |
| 3,261,269 | 7/1966 | McGovern | 106/279 |
| 4,661,378 | 4/1987 | McGovern | 427/140 |

*Primary Examiner*—David Brunsman
*Attorney, Agent, or Firm*—Webb Ziesenheim Bruening Logdson Orkin & Hanson, P.C.

[57] ABSTRACT

A composition for coating and treating aggregate intended for use in paving applications is a blend of high temperature coal tar pitch combined with coal tar oils resulting from distilling high temperature coke oven tar to pitch having a softening point from between 100° to 400° F. cube in Air. The oil blend having a distillation curve to 300° C. ASTM D 158 is shown in Table I; in separate embodiments as shown in columns I and II.

TABLE I

| Compositions | I | II |
|---|---|---|
| Aromatic Residue | 0–15% | 2.5–4.5% |
| Top Tar | 30–45% | 0–15% |
| BCO Tar Oil | 0.005–12.4% | 0.005–12.4% |
| Heavy Oil | 0.005–12.4% | 0.005–12.4% |
| Solvent | 25–35% | 20–35% |

This blend of coal tar pitch and oils is optionally further blended with 0.10 to 15.00% aromatic residue from fluidized catalytic cracking or thermofor catalytic cracking and thinned to the desired viscosity.

10 Claims, No Drawings

PAVEMENT AGGREGATE TREATING COMPOSITION

FIELD OF THE INVENTION

The invention relates to improvements in pavement aggregate treating compositions, and the methods of using them in new pavement constructions and in the repair and/or overlay of existing pavement.

BACKGROUND OF THE INVENTION

The creation and maintenance of paved surfaces has a long history, but very little in that long history has prepared the industry for its current demands and constraints. Environmental protection pressures have eliminated many traditionally accepted materials and solvents for use as pavement constituents. At the same time, roads and other paved surfaces are experiencing the stresses of greater traffic and larger, heavier vehicles (not to mention additional modern stresses such as acid rain and the extra wear inevitable from aggressive snow and ice removal) and the paving industry must therefore meet commensurately higher paving quality specifications with new, environmentally acceptable materials—and still do so in a commercially competitive way.

One way to preserve the integrity of paved surfaces is to maintain them, so as to avoid the necessity of rebuilding or resurfacing them. A bituminous pavement rejuvenator for such a purpose is disclosed in U.S. Pat. No. 3,221,615, incorporated herein by reference, which is a coal tar derivative composition containing specific ingredients and having particular specifications. Other pavement treating compositions are disclosed in U.S. Pat. No. 3,261,269 and U.S. Pat. No. 4,661,378, also incorporated herein by reference, which disclose pavement dressing conditioners which contain the above-described bituminous pavement rejuvenator together with additional ingredients and/or solvents. These pavement treating compositions are generally spread or sprayed onto existing pavement surfaces (not only bituminous surfaces but concrete and other surfaces as well) to preserve and to restore the integrity of the pavement.

Even these pavement preserving and restoring compositions, however, do not meet all the needs of the current pavement maintenance industry. For example, pavement restorers often wish to restore bituminous pavements with a composition which will also retain a top layer of fine aggregate, for additional strength and finish in the restoration. Fine aggregate can be considered to be any natural or manufactured sand with 100% passing a No. 4 sieve and not more than 10% passing a No. 200 sieve. However, existing pavement treating compositions, with a few exceptions, are not generally good at retaining fine aggregate. In addition, existing pavement treating compositions are not noted for their ability reliably to fill cracks in bituminous pavement or to yield long wear in such repairs—nor are the compositions well adapted for pavement treating followed by immediate resistance to the stresses of weather or restored traffic.

Moreover, responsible attitudes toward environmental protection dictate not only care in the choice of solvents and paving materials, but virtually mandate the use of recyclable materials in paving construction and repair. These materials should include, and certainly need not be limited to, slag and other byproducts of coke and steel production, recycled asphalt, divided recycled automobile tires, crushed shells of aquatic life, particulated recycled plastics, vegetable wastes such as rice hulls and rice hull ash, or virtually any other aggregate suitable for incorporation in paving construction or repair materials. Choice of aggregate has been limited in the prior art, at least in some applications, to materials which 1) are chemically and physically stable and which 2) are appropriately susceptible of adherence to the binder to be used in the paving composition. Heretofore, aggregate additions for paving compositions needed to be selected with care, but an ideal paving composition—previously elusive—would accommodate all of them.

Therefore, a need remains for a composition which can be used to construct, or to repair, pavement, which has all the advantages of prior art conditioners and rejuvenators, but which binds with and stabilizes a wide range of aggregate including recycled aggregate, provides long lasting pavement crack repair, gives good resistance to weather, even soon after application, and allows for prompt restoration of the pavement to its normal use. The invention also includes the novel method of stabilizing and binding aggregate with a composition uniquely suited to doing so.

SUMMARY OF THE INVENTION

In order to meet this need, the present invention is a blend of high temperature coal tar pitch combined with coal tar oils resulting from distilling high temperature coke oven tar to pitch having a softening point from between 100° to 400° F. cube in Air. The first embodiment (I) and preferred embodiments (II) of the oil blend, having a distillation curve to 300° C. ASTM D 158, are shown in Table I.

TABLE I

| Compositions | I | II |
|---|---|---|
| Aromatic Residue (1) | 0–15% | 2.5–4.5% |
| Refined Tar: Viscosity @ 60° C. Engler 2.0 to 91 on Float @ 50° C. - 12 to 250 sec. | 30–45% | 0–15% |
| BCO Tar Oil | 0.005–14.99% | 0.005–14.99% |
| Heavy Oil | 0.005–14.99% | 0.005–14.99% |
| Solvent | 25–35% | 20–35% |
| Flash Pt. TCC °F. | 105 min. | |
| Spec. Grav. @ 25/25° C. | 1.10 max | |
| Water % by weight | 2.0% max | |
| Engler Viscosity 50 cc @ 60° C. - D-20 Distillation | 7.5 to 91.0 | |
| % by weight to 300° C. - | 30–60% | |
| Softening Point °C. R & B Residue above 300° C. - | 35° C. minimum | |

Examples of Aromatic Residues
Used in Pavement Aggregate Treating Composition

| Aromatic Residue | Producer |
|---|---|
| 1. Aromatic Conversion Oil | Exxon |
| 2. Ola Tar | Exxon |
| 3. S-2 Tar | Exxon |
| 4. Aromatic Concentrate | Atlantic Richfield |
| 5. Shell 420 | Shell Oil Company |
| 6. Shell 100 | Shell Oil Company |
| 7. Arco Petrobase 100 | Shell Oil Company |
| 8. Promar 501 | Mobil Oil Company |
| 9. Decant Oil | Getty Oil Company |
| 10. PR Resin | Monsanto |
| 11. Monar | Sun Oil |

This blend of coal tar pitch and oils is optionally further blended with 0.10 to 15.00% aromatic residue from fluidized catalytic cracking or thermofor catalytic cracking that can vary in viscosity from a float at 32° C. of 20 seconds to a hard pitch softening above 400° F. cube in Air. If the composition is to be used as a precoat to stabilize aggregate so it can be used in bituminous mixes, the composition is then thinned to the desired Engler Viscosity at 50° C. of 1.5 to 6.0 with coal tar solvent naphtha, or an aromatic solvent such as Hi Sol 10 of Ashland Chemicals Company, or Super Hi Flash Naphtha of Unocal Corporation, and equivalent solvents. If used as a binder for use as a paving, or patching mix, the viscosity of the composition is adjusted upward to a higher consistency so as to act as a binder similar to AC-2.5 asphalt.

DETAILED DESCRIPTION OF THE INVENTION

The present invention is a blend of high temperature coal tar pitch combined with coal tar oils resulting from distilling high temperature coke oven tar to pitch having a softening point from between 100° to 400° F. cube in Air. The oil blend having a distillation curve to 300° C. ASTM D 158 is shown in Table I, with the first embodiment shown in column I and the preferred embodiment ranges in column II.

TABLE I

| Compositions | I | II |
|---|---|---|
| Aromatic Residue (1) | 0–15% | 2.5–4.5% |
| Refined Tar | 30–45% | 0–15% |
| BCO Tar Oil | 0.005–14.99% | 0.005–14.99% |
| Heavy Oil | 0.005–14.99% | 0.005–14.99% |
| Solvent | 25–35% | 20–35% |
| Flash Pt. TCC °F. | | 105 min. |
| Spec. Grav. @ 25/25° C. | | 1.10 max |
| Water % by weight | | 2.0% max |
| Engler Viscosity 50 cc @ 60° C. - | | 1.5 to 91.0 |
| D-20 Distillation | | |
| % by weight to 300° C. - | | 30–60% |
| Softening Point °C. R & B Residue above 300° C. - | | 35° C. minimum |

Examples of Aromatic Residues

Used in Pavement Aggregate Treating Composition

| Aromatic Residue | Producer |
|---|---|
| 1. Aromatic Conversion Oil | Exxon |
| 2. Ola Tar | Exxon |
| 3. S-2 Tar | Exxon |
| 4. Aromatic Concentrate | Atlantic Richfield |
| 5. Shell 420 | Shell Oil Company |
| 6. Shell 100 | Shell Oil Company |
| 7. Arco Petrobase 100 | Shell Oil Company |
| 8. Promar 501 | Mobil Oil Company |
| 9. Decant Oil | Getty Oil Company |
| 10. PR Resin | Monsanto |
| 11. Monar | Sun Oil |

This blend of coal tar pitch and oils is optionally further blended with 0.10 to 15.00% aromatic residue from fluidized catalytic cracking or thermofor catalytic cracking that can vary in viscosity from a float at 32° C. of 20 seconds to a hard pitch softening above 400° F. cube in Air. If the composition is to be used as a precoat to stabilize aggregate so it can be used in bituminous mixes, the composition is then cut back (thinned) to the desired Engler Viscosity at 50° of 1.5 to 6.0 with coal tar solvent naphtha, or an aromatic solvent such as Hi Sol 10 of Ashland Chemicals Company, or Super Hi Flash Naphtha of Unocal Corporation, and equivalent solvents. If used as a binder for use as a paving or patching mix, the viscosity of the composition is adjusted upward to a higher consistency so as to act as a binder similar to AC-2.5 asphalt.

The present composition, when thinned to desired viscosity, is able to coat hydrophobic aggregate to form a quick hardening, inert film which maintains the hydrophilic character of the aggregate after it is incorporated in the paving composition. Hydrophilic and chemically reactive aggregates are converted, when coated with the present composition, to nonreactive, hydrophobic aggregate. The present composition and method, therefore, render virtually any aggregate suitable for incorporation in any bituminous binder or paving composition.

The present composition and method are also beneficial when applied to what amount to extremely large aggregate particles, i.e., existing pavements to be rejuvenated or overlaid. In the construction of overlays atop existing pavements it was customary to apply a light coat of bituminous material (asphalt) called a "tack coat" to form a bond between the old pavement and a new overlay. Quite often this prior art tack coat acted as a barrier and allowed the overlay to slide over the old pavement under the stress of traffic. When the composition according to the present invention is sprayed onto existing pavement, however, it penetrates the old pavement and leaves a firm coating on the surface to bond with the new overlay.

Pavement rejuvenating and conditioning compositions are disclosed in U.S. Pat. No. 3,221,615, U.S. Pat. No. 3,261,269 and U.S. Pat. No. 4,661,378 (now Reexamination Certificate No. 4,661,378), each of which is incorporated herein by reference. These related patents share certain common features with the composition of the present invention.

The bituminous pavement rejuvenator disclosed in U.S. Pat. No. 3,221,615 is a coal tar derivative containing a mixture of di-, tri- and tetracyclic aromatic compounds and their alkyl homologs containing lower alkyl groups together with a significant amount of phenolic and hydroxy derivatives, said mixture having a specific gravity at 25/25° C. of at least 1.08, a maximum Brookfield Viscosity at 25° C. of 30 cps, and an initial boiling point of at least 180° C. and a continuous boiling range to at least 300° C., 70–40% by volume of the material remaining as residue at 300° C. (together with additional specifications). The rejuvenator is disclosed as at least primarily intended to rejuvenate bituminous pavement, namely, asphalt roads. The patent identifies the ability of this bituminous pavement rejuvenator to plasticize the binder of the bituminous pavement as the assumed basis for its utility, and states that "[i] t has been found that the paving treated in accordance with this invention exhibits characteristics similar to those of a new pavement" and that "the pavement regains its ability to heal cracks under traffic and previously curled surfaces flatten under traffic," or in other words "regains its cold flow properties." The above-described bituminous pavement rejuvenator is itself an ingredient in the pavement dressing conditioner described in U.S. Pat. No. 3,261,269, although in different proportions than found in the present composition. The pavement dressing conditioner can be applied to asphalt, concrete and other paved surfaces and contains "road tar" and coal tar solvent in addition to bituminous pavement rejuvenator. When used to treat paved surfaces, this admixture is believed to restore the resilience of pavement which has otherwise started to harden and to crack, so as to prevent further cracking and even to restore the ability for self-healing of cracks to the existing pavement.

The pavement dressing conditioner described in Reexamination Certificate No. 4,661,378 is very similar to the pavement dressing conditioner disclosed in the '269 patent, except that it also includes the same specialized aromatic solvent as may be incorporated in the present composition in place of the coal tar solvent naphtha, as desired. The specifications of this aromatic solvent appear in the Reexamination Certificate No. 4,661,378.

It can thus be seen that the present invention is in part a method and in part a composition for neutralizing chemically reactive and hydrophobic aggregates, to allow the aggregates to be used in all types of paving constructions (including reconstructions) when used as a binder for paving mixes. Crushed and milled asphalt concrete recycled for use in new paving, either cold laid or hot mixed, can be reconditioned and/or rejuvenated prior to use alone or in admixture in hot mix concrete through the use of this invention. The ability of the present invention to stabilize reactive or otherwise substandard aggregate is especially economically and environmentally beneficial in that it allows for recycling of resources near the point of use, without costly energy-consuming transport of nonreactive and/or higher grade aggregate from distant sources.

The composition according to the present invention stabilizes reactive aggregates by penetrating into the pores of the aggregate and sealing the pores with a film that is inert to the acids in the aggregate. This sealing effect protects the asphalt binder (bitumen) from reacting with any acid, caustic or other reactive moiety in the aggregate, whatever its identity. For example, blast furnace slag can be treated by mixing the slag with 1–5% of the present composition, using any of a number of mixing techniques such as batch plant, continuous plant, rotary drum, concrete mixer or by spraying and mixing with a blade grader, after which the aggregate will have been rendered nonreactive for pavement construction or reconstruction purposes.

The present composition and method also renders aggregate nonreactive in a physical way. Porous and/or hydrophilic aggregate can absorb a great deal of water, both during and after paving, and this water retention is generally undesirable. By coating paving aggregate with the present composition, water absorption is reduced or eliminated in such a way as to improve the overall characteristics of any paving composition containing it.

The inventive composition may optionally be dispersed to form an aqueous-based emulsion or jelly. More particularly, bituminous pavement rejuvenators and pavement dressing conditioners are made into emulsions or jellies by agitating the rejuvenators and/or conditioners in cationically- or anionically-modified aqueous solvents. These solvents include aqueous polyvinylalcohol; aqueous amines; aqueous compounded amines such as those available from Akzo Chemicals and sold under the tradename Redicote (i.e., Redicote E-9) or those available from B. F. Goodrich Chemical Co. and sold under the tradename Carbopol; and aqueous solutions of aliphatic fatty acids (such as Tall Oil) and caustic (usually sodium hydroxide). When the emulsifying agent concentration in the solution is increased, the solution may be used to form jellied products, whereas more dilute aqueous solutions of the emulsifying agents are suitable for preparing lower viscosity emulsions of the rejuvenating and conditioning compositions.

The present aggregate binding composition may be enhanced by dispersing it with aqueous emulsifying agents and water, to form emulsions or jellies. The emulsifying agents can include aqueous polyvinylalcohol; aqueous amines; aqueous compounded amines such as those available from Akzo Chemicals and sold under the tradename Redicote (i.e., Redicote E-9) or those available from B.F. Goodrich Chemical Co. and sold under the tradename Carbopol; and aqueous solutions of aliphatic fatty acids and caustic (usually sodium hydroxide). Exemplary amines are commercially available primary aliphatic amines; trimethylaminediamines such as N-alkyl trimethylenediamine; polyethoxylated aliphatic amines and diamines ($C_8$ to $C_{18}$); amine acetate salts derived from primary, secondary or tertiary amines with the alkyl group ranging from $C_8$ to $C_{18}$; high molecular weight aliphatic primary, secondary or tertiary amines ($C_8$ to $C_{18}$); and quaternary ammonium salts containing one or two alkyl groups ranging from $C_8$ to $C_{18}$. Compounded amines are commercially available and are generally complexed or otherwise stabilized compositions with preserved amine functionality. Ionic aliphatic fatty acids include nonionic polyethoxylated fatty acid compositions available under the tradename Ethofat and other commercially available fatty acid, tall oil and tallow or animal fat ($C_{16}$ to $C_{18}$) based cationic emulsifiers.

In order to prepare a high viscosity jelly, suitable for spreading and retaining on difficult surfaces such as the insides of pavement cracks and the groundwater-exposed bases of telephone poles and dock pilings, aqueous solutions containing generous amounts of the emulsifying agent should be used. The aqueous polyvinylalcohol concentration should be about 6.0 to 15% by weight (of water); the aqueous fatty acid cation concentration should be about 3.0 to 17% by weight; and the aqueous amine concentration should be between about 3 to 11% by weight (which includes a relatively small amount of acid—i.e., 0.8–2.5% by weight HCl—to dissociate the amine into the necessary cation), again regardless of whether the amine derives from a known primary, secondary, tertiary or quaternary amine or from a commercial compounded amine of unknown formula. For thinner preparations of the present composition, smaller amounts of emulsifying agent(s) should be used. Emulsification is accomplished by any methods including by the use of standard industrial emulsification equipment of various types.

An important aspect of the present invention is the method of stabilizing aggregate, particularly reactive aggregate, by coating the aggregate with the composition described herein. Coating may be accomplished by spraying, physical mixing or any other coating method applicable to paving aggregate. As described above, the composition is especially well suited to coating existing pavement for the purpose of binding aggregate applied thereover or admixed therein. A wide variety of amounts may be used, such as 1–100% or more of composition by weight of the aggregate, more preferably about 1–20% by weight of composition based on the weight of the aggregate, most preferably 5–10% by weight of the weight of the aggregate.

Although the invention has been described with particularity above, the following examples illustrate specific embodiments of the above-described invention.

EXAMPLE 1

An aggregate coating composition was prepared by admixing 15% aromatic residue (a mixture of di-, tri- and tetracyclic aromatic compounds and their alkyl homologs containing lower alkyl groups together with a significant amount of phenolic and hydroxy derivatives, said mixture having a specific gravity at 25/25° C. of at least 1.08, a maximum Brookfield Viscosity at 25° C. of 30 cps, and an initial boiling point of at least 180° C. and a continuous boiling range to at least 300° C., 70–40% by volume of the material remaining as residue at 300° C.) with 45% Top Tar, 12.4% BCO Tar Oil, 12.4% Heavy Oil, 0.10% aromatic residue from fluidized catalytic cracking and remainder Hi Sol solvent. The resultant blend was then cut back (thinned) to the desired Engler Viscosity at 60° of 1.0 to 91 with the same Hi Sol 10 solvent. The resulting composition was ready for immediate use as a coating or a binder for paving aggregate.

EXAMPLE 2

The composition prepared according to Example 1 was admixed with particulated automobile tires by spraying about 5% by weight of the composition onto the rubber particles, based on the weight of the particles. The composition and rubber particles were admixed in a rotating mixer and then were further mixed with hot asphalt for immediate use in pavement reconstruction.

EXAMPLE 3

An aggregate coating composition was prepared by admixing 10aromatic residue (a mixture of di-, tri- and tetracyclic aromatic compounds and their alkyl homologs containing lower alkyl groups together with a significant amount of phenolic and hydroxy derivatives, said mixture having a specific gravity at 25/25° C. of at least 1.08, a maximum Brookfield Viscosity at 25° C. of 30 cps, and an initial boiling point of at least 180° C. and a continuous boiling range to at least 300° C., 70–40% by volume of the material remaining as residue at 300° C.) with 40% Top Tar, 10% BCO Tar Oil, 12.4% Heavy Oil, and remainder Hi Sol solvent. The resultant blend was then cut back (thinned) to the desired Engler Viscosity at 60° of 1 to 6.0 with the same Hi Sol 10 solvent. The resulting composition was ready for immediate use to coat paving aggregate or to spray on existing pavement prior to overlaying it with an asphalt layer.

EXAMPLE 4

Ninety-eight parts by weight H$_2$O were mixed with 1.0 part by weight Redicote E-9 and about 0.1 part by weight HCl, and the resulting solution was heated to 120° F. Fifty parts by weight of the solution were admixed with fifty parts by weight of the composition prepared in accordance with Example 1. A standard industrial colloid mill was used to emulsify the combined ingredients into a low viscosity emulsion.

EXAMPLE 5

An aggregate coating composition was prepared by admixing 2.5% aromatic residue (see Example 1) with 15% Top Tar, 0.005% BCO Tar Oil, 0.005% Heavy Oil, 0.5% aromatic residue from fluidized catalytic cracking and remainder Hi Sol solvent. The resulting composition was ready for immediate use to coat paving aggregate for addition to asphalt pavement reconstruction materials.

EXAMPLE 6

An aggregate coating composition was prepared by admixing 4.5% aromatic pitch (see Example 1) with 15% Top Tar, 12.4% BCO Tar Oil, 12.4% Heavy Oil, 15% aromatic residue from fluidized catalytic cracking and remainder Hi Sol solvent. The resultant blend was then cut back (thinned) to the desired Engler Viscosity at 60° of between 1 to 6.0 with the same Hi Sol 10 solvent. The resulting composition was ready for immediate use to coat paving aggregate.

Although the invention has been described with particularity in the foregoing passages, with reference to specific materials and methods, the invention is only to be limited as is set forth in the accompanying claims.

I claim:

1. An aggregate binding composition comprising a blend of,
    a bituminous pavement rejuvenator consisting essentially of a coal tar derivative containing a mixture of di-, tri- and tetracyclic aromatic compounds and their alkyl homologs containing lower alkyl groups together with a significant amount of phenolic and hydroxy derivatives, said mixture having a specific gravity at 25/25° C. of at least 1.08, a maximum Brookfield Viscosity at 25° C. of 30cps, and an initial boiling range to at least 300° C., with 70–40% by volume of the material remaining as residue at 300° C. and,
    coal tar oils resulting from distilling high temperature coke oven tar to pitch selected from the group consisting of compositions I and II:

| Compositions | I | II |
|---|---|---|
| Aromatic Residue | 0–15% | 2.5–4.5% |
| Top Tar | 30–45% | 0–15% |
| BCO Tar Oil | 0.005–12.4% | 0.005–12.4% |
| Heavy Oil | 0.005–12.4% | 0.005–12.4% |
| Solvent | 25–35% | 20–35% |
| Flash Pt. TCC F | 105 min. | |
| Spec. Grav. @ 25/25 C | 1.10 max | |
| Water % by weight | 2.0% max | |
| Engler Viscosity | 50 cc @ 60 F - 1-91 | |
| D-20 Distillation | | |
| % by weight to 300 C - | 30–60% | |
| Softening Point C R & B - | 35 C minimum | |
| Residue above 300. | | |

2. The composition according to claim 1 further including about 0.10–15% aromatic residue form fluidized catalytic cracking or thermofor catalytic cracking.

3. The aggregate binding composition according to claim 1 wherein said composition is in aqueous emulsified form.

4. A method of stabilizing paving aggregate by treating a quantity of aggregate to be stabilized with greater than 1% by weight, based on the weight of the aggregate, with the composition according to claim 1.

5. The method according to claim 4 wherein said treating step further comprises a mixing step using a technique selected from the group consisting of batch plant technique, continuous plant technique, rotary drum technique, concrete mixer technique and blade grader technique.

6. The method according to claim 5 wherein said aggregate to be treated is selected from the group consisting of slag and other byproducts of coke and steel production, recycled asphalt, divided recycled automobile tires, crushed shells of aquatic life, particulated recycled plastics, rice hulls and rice hull ash.

7. The method according to claim 6 wherein said aggregate is coated with about 1–100% by weight of said composition.

8. The method according to claim 7 wherein said aggregate is coated with about 1–20% by weight of said composition.

9. The method according to claim 8 wherein said aggregate is coated with about 5–10% by weight of said composition.

10. The method according to claim 9 wherein said aggregate is simultaneously mixed with said composition and a quantity of asphalt, followed by the step of reconstructing a road pavement with the resulting asphalt/aggregate/composition admixture.

* * * * *

UNITED STATES PATENT AND TRADEMARK OFFICE
CERTIFICATE OF CORRECTION

PATENT NO. : 5,762,699
DATED : June 9, 1998
INVENTOR(S) : Edward W. McGovern

It is certified that error appears in the above-identified patent and that said Letters Patent is hereby corrected as shown below:

Column 7 Line 21 "10aromatic" should read --10% aromatic--.

Claim 1 Column 8 Lines 4-5 "blend of," should read --blend of;--.

Signed and Sealed this

Sixteenth Day of February, 1999

Attest:

Attesting Officer

Acting Commissioner of Patents and Trademarks